(12) United States Patent
Garcia et al.

(10) Patent No.: US 12,356,432 B2
(45) Date of Patent: Jul. 8, 2025

(54) SIDELINK COMMUNICATIONS

(71) Applicant: JRD COMMUNICATION (SHENZHEN) LTD., Guangdong (CN)

(72) Inventors: Virgile Garcia, Guangdong (CN); Umer Salim, Guangdong (CN)

(73) Assignee: JRD COMMUNICATION (SHENZHEN) LTD., Guangdong (CN)

( * ) Notice: Subject to any disclaimer, the term of this patent is extended or adjusted under 35 U.S.C. 154(b) by 193 days.

(21) Appl. No.: 17/754,718

(22) PCT Filed: Sep. 24, 2020

(86) PCT No.: PCT/CN2020/117375
§ 371 (c)(1),
(2) Date: Apr. 8, 2022

(87) PCT Pub. No.: WO2021/068754
PCT Pub. Date: Apr. 15, 2021

(65) Prior Publication Data
US 2024/0080862 A1 Mar. 7, 2024

Related U.S. Application Data

(60) Provisional application No. 62/913,086, filed on Oct. 9, 2019.

(51) Int. Cl.
*H04W 72/25* (2023.01)
*H04L 5/00* (2006.01)
*H04W 72/30* (2023.01)

(52) U.S. Cl.
CPC .......... *H04W 72/25* (2023.01); *H04L 5/0048* (2013.01); *H04W 72/30* (2023.01)

(58) Field of Classification Search
CPC ....... H04W 92/18; H04W 4/40; H04W 76/14; H04W 24/10; H04W 72/02; H04W 72/20; H04W 4/46; H04W 8/24; H04B 7/0626
See application file for complete search history.

(56) References Cited

U.S. PATENT DOCUMENTS

| | | | |
|---|---|---|---|
| 2017/0013628 A1 | 1/2017 | Kim et al. | |
| 2020/0336872 A1* | 10/2020 | Basu Mallick | ....... H04W 4/029 |
| 2021/0091903 A1* | 3/2021 | Taherzadeh Boroujeni | ................ H04L 5/0051 |

FOREIGN PATENT DOCUMENTS

| | | |
|---|---|---|
| CN | 103081374 A | 5/2013 |
| CN | 108886396 A | 11/2018 |
| CN | 109565307 A | 4/2019 |
| EP | 3720026 A1 | 10/2020 |
| WO | 2019128261 A1 | 7/2019 |

OTHER PUBLICATIONS

International Search Report in International application No. PCT/CN2020/117375, mailed on Dec. 21, 2020.
(Continued)

*Primary Examiner* — Khalid W Shaheed
(74) *Attorney, Agent, or Firm* — PV IP PC; Wei Te Chung (57) ABSTRACT

Methods for transmitting CSI and/or position information between nodes in a network. In particular processes and systems for sidelink groupcast transmissions in a cellular network.

16 Claims, 5 Drawing Sheets

(56) References Cited

OTHER PUBLICATIONS

Written Opinion of the International Search Authority in international application No. PCT/CN2020/117375, mailed on Dec. 21, 2020.
Apple Considerations on Nr V2X physical layer procedure 3GPP TSG RAN WG1 #97 R1-1907337 May 17, 2019 (May 17, 2019), section 1-5.
Interdigital, Inc. On Physical Layer Procedures for Nr V2X Sidelink 3GPP TSG RAN WG1 #97 R1-1907096 May 17, 2019(May 17, 2019). the whole document.
Qualcomm Incorporated Physical layer procedures for sidelink 3GPP TSG RAN WG1 Meeting #97 R1-1907274 May 17, 2019(May 17, 2019), the whole document.
European Search Report in European application No. 20873433.5, mailed on Dec. 20, 2023.
Apple: "Considerations on NR V2X physical layer procedure", 3GPP Draft; R1-1907337 Considerations on NR V2X Physical Layer Procedures, 3rd Generation Partnership Project (3GPP), Mobile Competence Centre; 650, Route Des Lucioles; F-06921 Sophia-Antipolis Cede, vol. RAN WG1, No. Reno, USA; May 13, 2019-May 17, 2019, May 13, 2019(May 13, 2019), XP051728776.
Huawei et al: "Sidelink physical layer procedures for NR V2X", 3GPP Draft; R1-1906008, 3rd Generation Partnership Project (3GPP), Mobile Competence Centre; 650, Route Des Lucioles; F-06921 Sophia-Antipolis Cedex; France, vol. RAN WG1, No. Reno, USA; May 13, 2019-May 17, 2019 May 3, 2019 (May 3, 2019), pp. 1-23, XP051708050.
Huawei et al: "Sidelink CSI", 3GPP Draft; R1-1903070, 3rd Generation Partnership PROJECT(3GPP), Mobile Competence Centre; 650, Route Des Lucioles; F-06921 Sophia-Antipolis Cedex; France, vol. RAN WG1, No. Athens, Greece; Feb. 25, 2019-Mar. 1, 2019 Feb. 15, 2019(Feb. 15, 2019), XP051600766.
Ericsson: "PHY layer procedures for NR sidelink", 3GPP Draft; R1-1910538 Ericsson-Phy Layer Procedures for NR Sidelink, 3rd Generation Partnership Project (3GPP), Mobile Competence Centre; 650, Route Des Lucioles; F-06921 Sophia-Antipolis Cedex, vol. RAN WG1, No. Chongqing, China; Oct. 14, 2019-Oct. 20, 2019 Oct. 7, 2019(Oct. 7, 2019), XP051808939.
TCL Communication: "Physical Layer Procedures for Sidelink", 3GPP Draft; R1-1908279_SIDELINK_PHY_PROCEDURES_FINAL, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Aug. 26, 2019-Aug. 30, 2019 Aug. 14, 2019(Aug. 14, 2019), XP051764892.
TCL Communication: "Views on Sidelink_Enhancement Priorities for R17", 3GPP Draft; RP-192834, 3rd Generation Partnership PROJECT(3GPP), Mobile Competence Centre; 650, Route Des Lucioles; F-06921 Sophia-Antipolis Cedex; France, vol. TSG RAN,n o. Sitges, Spain; Dec. 9, 2019-Dec. 12, 2019 Dec. 2, 2019(Dec. 2, 2019), XP051834435.
Chinese Office Action issued in corresponding Chinese Patent Application No. 202080070635.2 dated Feb. 13, 2025, pp. 1-10.
NPL1: Lenovo, Motorola Mobility, R1-1910147 "Discussion on physical layer procedures for NR sidelink".

* cited by examiner

SIDELINK COMMUNICATIONS

This application claims the benefits of International Application No. PCT/CN2020/117375, filed Sep. 24, 2020, which claims priority to a U.S. provisional application No. 62/913,086, filled on Oct. 9, 2019. The entire disclosures of each of the applications are incorporated herein by reference.

TECHNICAL FIELD

The following disclosure relates sidelink communications, and in particular to reporting channel quality or position for such communications.

BACKGROUND

Wireless communication systems, such as the third-generation (3G) of mobile telephone standards and technology are well known. Such 3G standards and technology have been developed by the Third Generation Partnership Project (3GPP). The 3rd generation of wireless communications has generally been developed to support macro-cell mobile phone communications. Communication systems and networks have developed towards a broadband and mobile system.

In cellular wireless communication systems User Equipment (UE) is connected by a wireless link to a Radio Access Network (RAN). The RAN comprises a set of base stations which provide wireless links to the UEs located in cells covered by the base station, and an interface to a Core Network (CN) which provides overall network control. As will be appreciated the RAN and CN each conduct respective functions in relation to the overall network. For convenience the term cellular network will be used to refer to the combined RAN & CN, and it will be understood that the term is used to refer to the respective system for performing the disclosed function.

The 3rd Generation Partnership Project has developed the so-called Long Term Evolution (LTE) system, namely, an Evolved Universal Mobile Telecommunication System Territorial Radio Access Network, (E-UTRAN), for a mobile access network where one or more macro-cells are supported by a base station known as an eNodeB or eNB (evolved NodeB). More recently, LTE is evolving further towards the so-called 5G or NR (new radio) systems where one or more cells are supported by a base station known as a gNB. NR is proposed to utilise an Orthogonal Frequency Division Multiplexed (OFDM) physical transmission format.

In conventional cellular communication networks, all signalling is between each mobile device and a base station rather than directly between mobile devices, even if the mobile devices are within wireless communication range of each other. This may lead to inefficient use of wireless transmission resources and may increase base station resource utilisation. Sidelink communications allow mobile devices to communicate directly rather than via a base station, potentially improving wireless and base station resource utilisation. Sidelink communications are considered particularly interesting for Machine to Machine communications, particularly Vehicle to Vehicle (V2V) and Vehicle to Everything/Anything (V2X) communications.

Three principle categories of sidelink communications are proposed—unicast, groupcast, and broadcast. Unicast transmissions are one to one transmissions between defined UEs. Groupcast transmissions are one to many transmissions, but where only UEs in the group can receive the transmissions. Broadcast transmissions are one to many with no control on recipients.

Channel State Information (CSI) may be utilised by a transmitter for link adaptation such that an appropriate modulation and coding scheme (MCS) can be selected and other parameters, such as transmit power, used. CSI can also be utilised to assist with correct beam-forming when multiple antennas are utilised or with spatial multiplexing.

In Frequency Division Duplex (FDD) systems CSI is typically estimated at a receiver using reference symbols transmitted by the transmitter. The CSI is then transmitted to the transmitter for use. The same process may be utilised in Time Division Duplex (TDD) systems or return transmissions from the receiver UE may be used by a UE to estimate CSI. However, this method assumes channel reciprocity which may not be the case due to hardware variations in the UEs. It is therefore more common to adopt an approach of estimating CSI at a receiver and transmitting it to the transmitter.

Groupcast communications present a particular difficulty for CSI estimation since the number of links increases geometrically with the number of UEs in the group. To date there have not been efforts to provide CSI estimation in groupcast scenario.

Sharing location information between UEs may also be beneficial. For example, the location information may be used for user grouping, relaying/cooperation management, group leader selection, and/or power control. Typically, the term location refers to the absolute position of a UE which can be used by other UEs (or base stations or other nodes) to calculate distances and directions. The word position will be used herein as a collective title for information relating to location, distance, and/or position. In a groupcast system position information may be particularly useful as it may be used to define the behaviour of sidelink receivers. For example, above a certain distance from the transmitter a receiver is not required to transmit HARQ feedback.

The disclosure below relates to various improvements to cellular wireless communications systems, and in particular sidelink communications in such systems.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

There is provided a method of determining channel state information in a groupcast system, the method comprising the steps of transmitting a signal including a CSI-RS from a first UE which is a member of a group of UEs to all other UEs of the group as a groupcast message; and transmitting a signal including channel state information from each UE of the group receiving the CSI-RS to the first UE.

Transmission resources for the CSI-RS and/or channel state information may be allocated by a base station.

An indication of the allocated resources may be transmitted from the base station to the first UE, and the signal including the CSI-RS transmitted by the first UE includes an indication of the allocated resources for transmission of the channel state information.

An indication of the allocated resources may be transmitted from the base station to each UE of the group.

The method may further comprise the step of transmitting the channel state information from the first UE to the base station.

The method may be initiated by a request from the first UE to the base station.

The method may be initiated by the base station.

The transmission resources for the CSI-RS and/or channel state information may be selected by the first UE.

The channel state information may be transmitted by each UE as a unicast message to the first UE.

The channel state information may be transmitted by each UE as a groupcast message to all other UEs of the group including the first UE.

The method may further comprise a second UE of the group transmitting a signal including a CSI-RS to all other UEs of the group; and all UEs of the group other than the second UE transmitting channel state information in a groupcast message to all other UEs of the group.

The signal including channel state information may also include an indication of the transmitting UE's location.

UEs receiving the location information may utilise that information for directional transmissions to the relevant UE.

The first UE may transmit the location information to the base station.

There is also provided a method of determining channel state information in a groupcast system, the method comprising the steps of transmitting a message to each UE of a group instructing each UE to report channel state information to the base station in response to a CSIRS to be received from a first UE of the group; in response to the message the first UE transmitting a CSI-RS to the other UEs of the group; and each UE receiving the CSI-RS transmitting channel state information to the base station.

There is also provided a method of sharing location information between UEs, the method comprising transmitting an SCI message from a first UE of a group of UEs to at least one other UE of the group, wherein the SCI includes the first UE's location, and utilising the location for user grouping, relaying/cooperation management, group leader selection, and/or power control.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

DETAILED DESCRIPTION OF THE PREFERRED EMBODIMENTS

Those skilled in the art will recognise and appreciate that the specifics of the examples described are merely illustrative of some embodiments and that the teachings set forth herein are applicable in a variety of alternative settings.

Figure 1:
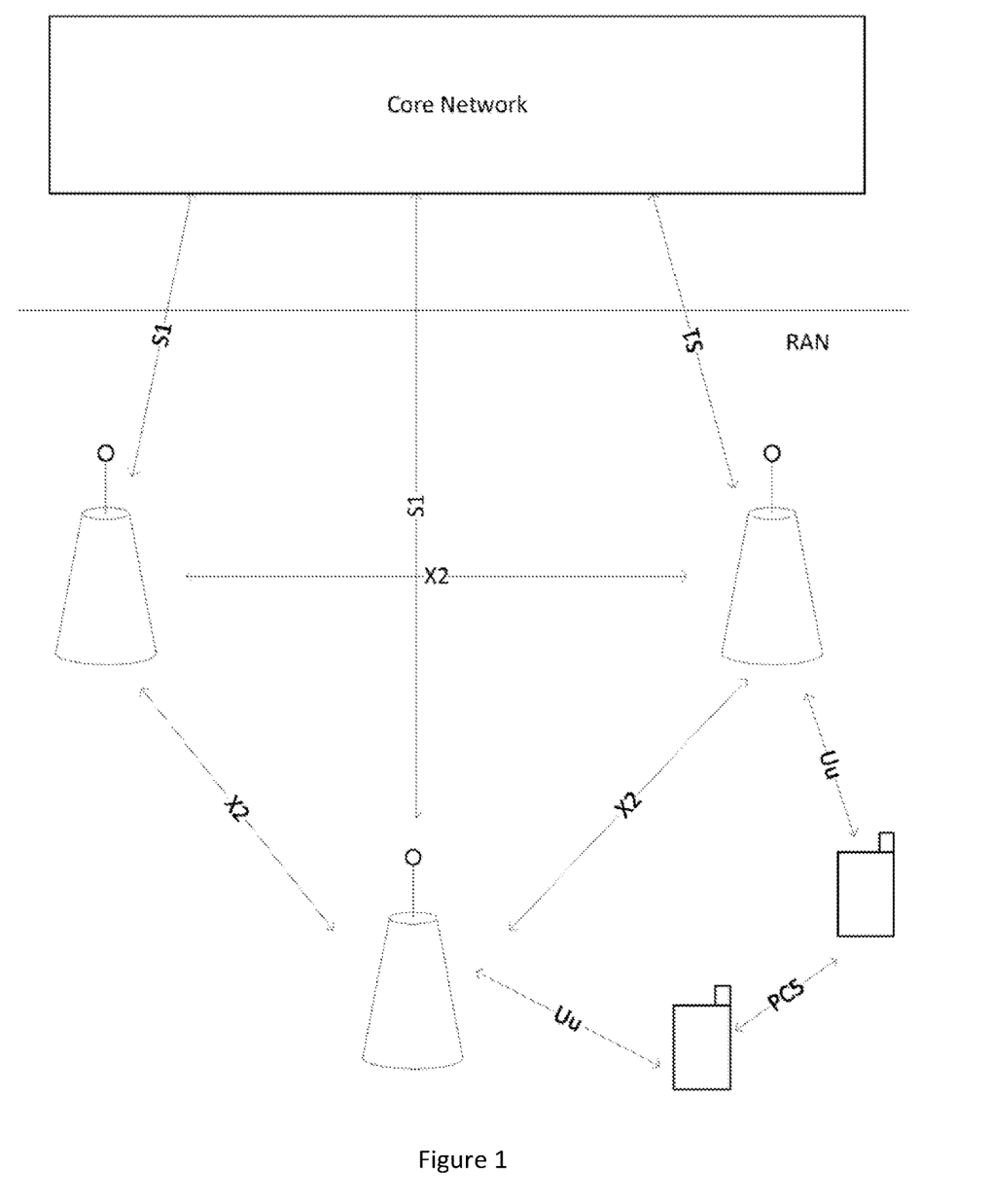
FIG. 1 shows selected elements of a cellular communication system.

FIG. 1 shows a schematic diagram of three base stations (for example, eNB or gNBs depending on the particular cellular standard and terminology) forming a cellular network. Typically, each of the base stations will be deployed by one cellular network operator to provide geographic coverage for UEs in the area. The base stations form a Radio Area Network (RAN). Each base station provides wireless coverage for I-JES in its area or cell. The base stations are interconnected via the X2 interface and are connected to the core network via the S1 interface. As will be appreciated only basic details are shown for the purposes of exemplifying the key features of a cellular network. A PC5 interface is provided between UEs for SideLink (SL) communications. The interface and component names mentioned in relation to FIG. 1 are used for example only and different systems, operating to the same principles, may use different nomenclature.

The base stations each comprise hardware and software to implement the RAN's functionality, including communications with the core network and other base stations, carriage of control and data signals between the core network and UEs, and maintaining wireless communications with UEs associated with each base station. The core network comprises hardware and software to implement the network functionality, such as overall network management and control, and routing of calls and data.

For sidelink communications between a transmit UE and a receive UE, data is received by the receive UE on a Physical Sidelink Shared Channel (PSSCH) and Sidelink Control Information (SCI) is received on a Physical Sidelink Control Channel (PSCCH). Feedback (ACK/NACK) signals may be provided from a receive UE to a transmit UE on a Physical Sidelink Feedback Channel (PSFCH).

Two modes of operation are proposed for resource (i.e. time/frequency resources) allocation for sidelink communications. A first mode (mode 1) is applied when UEs are in coverage of a base station and resources are allocated by the base station. A second mode (mode 2) is utilised when UEs are not in coverage of a base station and the UEs select and utilise resources autonomously, typically utilising a listen-before-transmit process.

UEs reserve resources for a transmission by transmitting an SCI message indicating the resources to be used. The SCI notifies the recipient (which may be a single UE in unicast, a group of UEs in groupcast, or all reachable UEs in broadcast) of the details of the transmission it can expect.

As noted above, to date efforts have not been made to provide CSI estimation for a groupcast system. CSI estimation for a group is more challenging as a group of N users has $N*(N-1)/2$ pairs of links. Managing all signalling and reporting may therefore lead to significant network loads. The following disclosure provides methods to enable CSI estimation in a groupcast system.

Typically, sidelink groupcast transmissions are made using omni-directional transmission since the locations of group members are diverse and unknown. However, if a transmitter UE is aware of the location of group members directional transmissions may enable significant power savings. In some applications, such as V2V, the relative positions of UEs may be structured (for example vehicles are limited to be positioned on roads) enabling simple indication of location which could be carried in a CSI message to enable directional transmission.

In order to improve the Quality of Service (QoS) of SL channels HARQ processes may be utilised. The resources used for transmission of the HARQ feedback may be utilised for the transmission of CSI from a receiver to a transmitter. In an example, a CSI-RS may be included in a groupcast transmission on PSSCH such that it is received by UEs in the group. The receiving UEs may each utilise the CSI-RS (or other means) to determine CSI (for example CQI, RI, PMI, RSRP, or RSSI) for the channel between the transmitter and respective UE. The UEs may then transmit the CSI to the transmitter UE using feedback resources corresponding to the PSSCH.

In a case where a base station or a central node (e.g. a group leader or designated UE) coordinates a group that base station/node would benefit from having CSI on all N*(N–I) links such that it can perform resource allocation, interference management, link adaption, power control, etc. In contrast each member of a group only needs CSI for the (N–I) links on which it will transmit. It is also beneficial for the central node/base station to maintain up to date CSI for all links such that scheduling and PHY management can be performed in real time based on the current state. Hence, continuous updating of the N*(N–I) links may be needed. This disclosure aims to reduce the number of transmissions to maintain the CSI, possibly to N transmissions, thus reducing signalling overhead and resource utilisation. In an example of a specific node performing CSI acquisition for itself, the number of CSI-RS transmissions may be reduced from N–I to a single groupcast transmission. If applied to all group members the previously noted N*(N–I) transmissions may be reduced to N groupcast transmissions.

Figure 2:
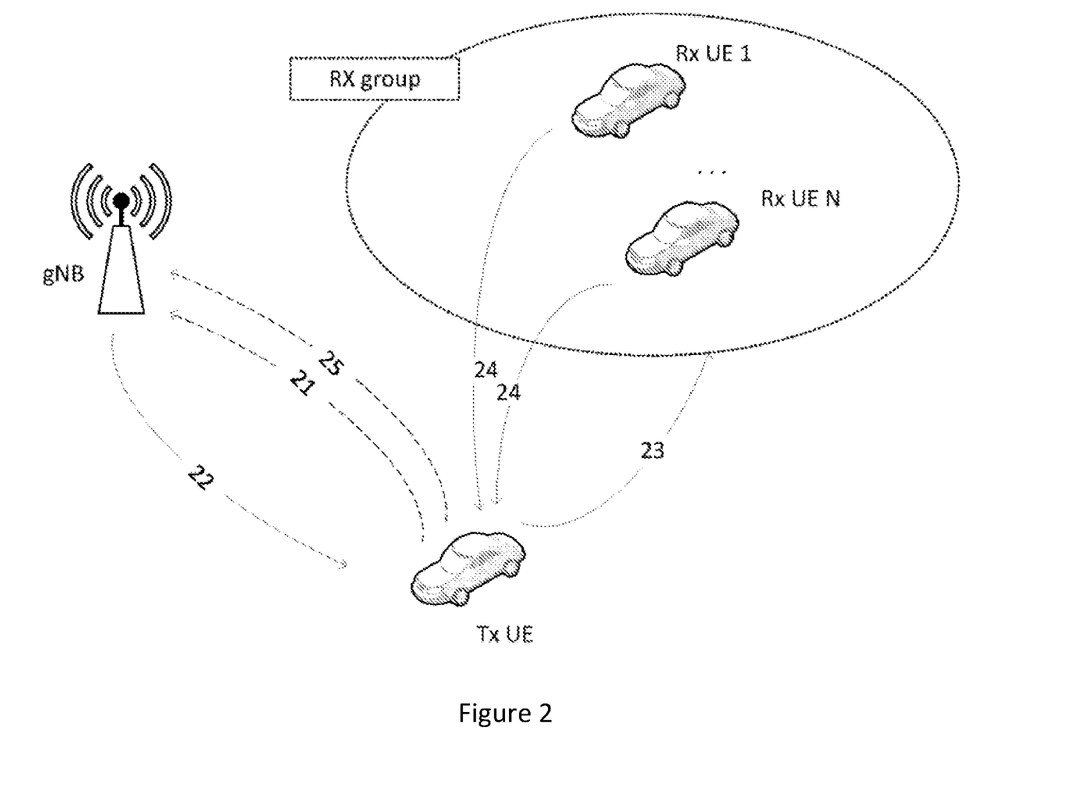
FIGS. 2 to 5 show various message flows in a group transmission system.

FIG. 2 shows a process for ascertaining CSI in a groupcast system operating in Mode 1. The group in this example has three members, but the principles extend to any number of members.

At step 21 the Tx UE initiates a CSI acquisition procedure with a message to the base station, but the process may also be initiated by the base station. At step 22 the base station allocates resources for the CSI-RSs and CSI reports, and transmits the allocations to the Tx UE (for example in an SCI or DCI message). In an alternative example the allocations are sent directly to all members of the group from the base station. The base station may transmit a UE-specific DCI to each group member or may transmit a group-common DCI indication. In a group-common DCI the UEs can determine the resource mapping implicitly to reduce overhead. Transmitting the resource indication only to the Tx UE, for distribution to other group members, may be advantageous, for example where not all group members are connected to the same base station.

At step 23 the Tx UE transmits the CSI-RS (with corresponding SCI, PSCCH, and PSSCH) as s groupcast transmission to all group members. If the CSI report resources were only indicated to the Tx UE at step 22, they are also indicated in the transmission.

At step 24 each of the group members transmits the CSI to the Tx UE on the indicated resources, and at step 25 the Tx UE may optionally transmit the CSI to the base station. The Tx UE, and base station if the CSI is transmitted to it, can then utilise the CSI for future transmissions from the Tx UE. The CSI acquisition still consumes resources and therefore use of on-demand CSI acquisition may be limited to conserve resources. On-demand CSI may be triggered by a node of a group, or the controlling node according to the specified configuration. Similarly, preconfigured periodic CSI acquisition may be prohibited. In an alternative example, specific CSI-RS may not be required and the UEs may determined CSI from other parameters, such as RSRP which can be acquired directly from received transmissions.

In some situations traffic may be known to be strictly periodic. In such a case CSI acquisition may be performed periodically, aligned with the known data transmissions.

It may be efficient to include the RS and CSI reports within the existing data (PSSCH), feedback (PSFCH), or control (PSCCH) channels rather than in a separate channel.

As noted above, CSI acquisition may be initiated by the Tx UE, in which case the CSI request may contain the group ID of the desired group for CSI acquisition (since a UE may be a member of more than one group) and so this may not be implicit. Indicating the group enables the base station to assign resources from the appropriate pool for the indicated group. When transmitting the indication of allocated resources the base station may include the group identifier such that the UEs are aware of the group for which the resources are to be utilised.

Figure 3:
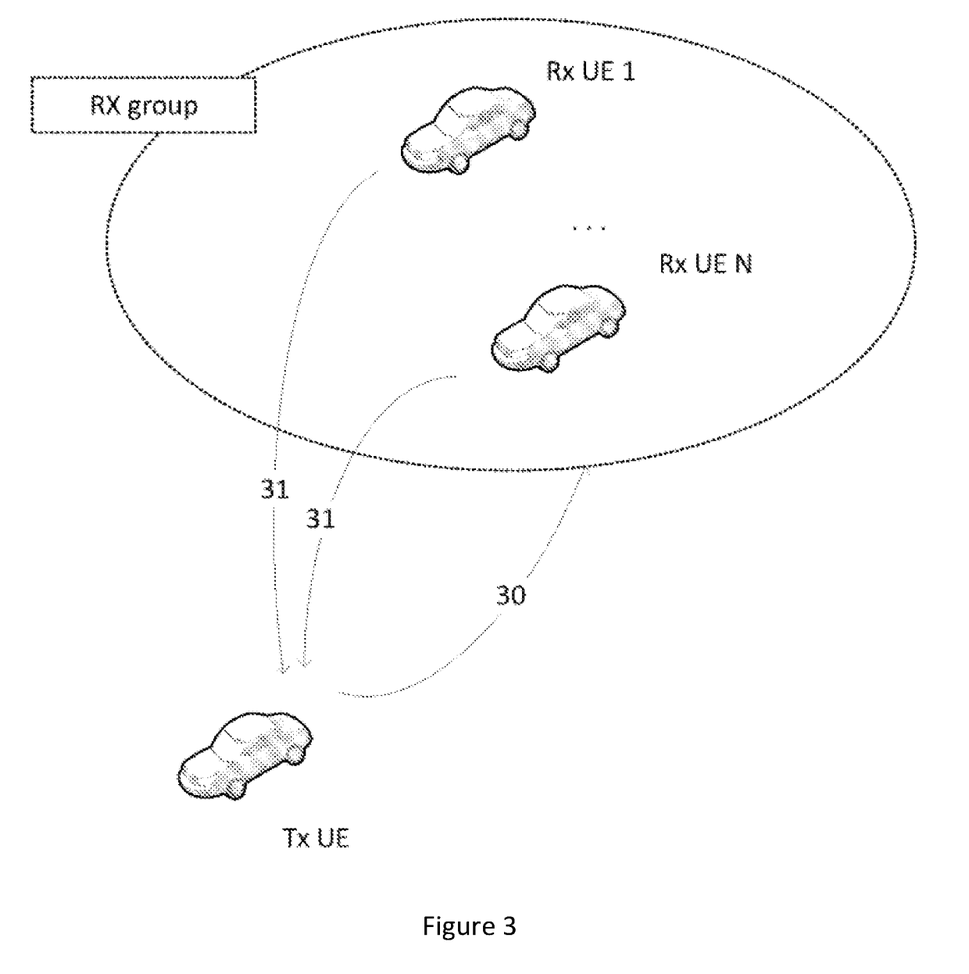

FIG. 3 shows an example of CSI acquisition in a groupcast system operating in Mode 2.

At step 30 the Tx UE selects resources and transmits CSI-RS in a PSSCH (with corresponding SCI, PSCCH, and PSSCH) as a groupcast transmission on the selected resources. The group members determine the CSI and report back to the Tx UE on the allocated PSSCH (or PSFCH) at step 31. The resources for the CSI report may be allocated by the Tx UE based on its own sensing and indicated to the other group members in the SCI (or as a paying in the PSSCH containing the CSI-RS). This process is expected to have good latency and duplexing features for the Tx UE, but availability of resources from the position of the other group members cannot be considered. Alternatively, each group member may select resources for its CSI response when it receives the CSI-RS. This process increases latency as the resource selection procedure delays the response transmission, but may allow better resource selection.

The benefits of accurate CSI may vary for different UEs in a group. For example, a platoon leader may transmit significantly more data to the platoon members than is transmitted back. Similarly, in an infotainment group in which a group member is broadcasting media to group members the transmission is highly asymmetric. The platoon leader or transmitter in these examples will gain more benefit from accurate CSI than other members. The acquisition of CSI may therefore be configurable to allow only a subset of the group to acquire CSI when desired.

In the above description the CSI reports have been sent in a transmission from the relevant group member to the Tx UE. However, reports could also be sent as a groupcast transmission, or to the base station on the Uu UL interface. The chosen method may vary depending on the particular scenario. For example, if a base station has triggered CSI acquisition the report may be sent to the base station, or if the UE triggers CSI acquisition the report may be sent to that UE.

Each CSI report may be sent using a unicast PSSCH data transmission such that the PSSCH only includes the CSI report and can hence be short. In order to reduce multiplexing and duplexing issues due to a potentially large number of reports it may be preferred to multiplex the CSI reports in the frequency domain such that the Tx UE receives a number of reports at the same time. Since the CSI-only report messages are small, and PSSCH allocation is normally on sub-channel granularity (i.e. one or more PRBs in the frequency domain), the sub-channel of PSSCH carrying reports can be shared by multiple users with their reports sent at PRB granularity within the sub-channel. The DCI or SCI messages can be used to indicate the resources to utilise.

In a further option, CSI reports for groupcast can be sent on the PSFCH. This may be attractive because PSFCH resources are typically (pre-)configured, thus reducing the overhead associated with using PSSCH, PSFCH resources are typically in the last few slots symbols of slots which may reduce duplexing issues, and a resource gain may be achieved when PSFCH resources are not fully utilised by performing ACK/NACK feedback thereby multiplexing data into the shared channel.

PSFCH resources are (pre-)configured, and can be activated, or considered activated, to carry CSI reports when CSI acquisition is being performed (e.g. when CSI-RS is received/indicated). Each UE may thus determine CSI report allocation in the PSFCH implicitly, or in accordance with an explicit allocation in the SCI. A specific format for a CSI report on PSFCH may be defined to allow multiplexing of CSI reports and ACK/NACK feedback.

When using PSFCH for CSI reporting group members may use the feedback resources associated with the PSSCH carrying the CSI-RS. The indication of resources can be sent in the SCI and may be carried with the message triggering the CSI report. If a group member cannot include both the CSI report and required feedback for data in the PSFCH corresponding to the PSSCH of the CSI-RS, transmission of the CSI report may be prioritised. The data feedback can then be sent jointly in the next feedback opportunity, with the feedback for the subsequent transmission. A revised format for the feedback may be required to enable transmission of feedback for two TBs in one message. Using the PSFCH for the CSI information, and utilising a later transmission for dual TB feedback, provides efficient utilisation of resources since no additional resources need to be reserved for the CSI report, and existing feedback mechanisms can be utilised for the delayed feedback.

Figure 4:
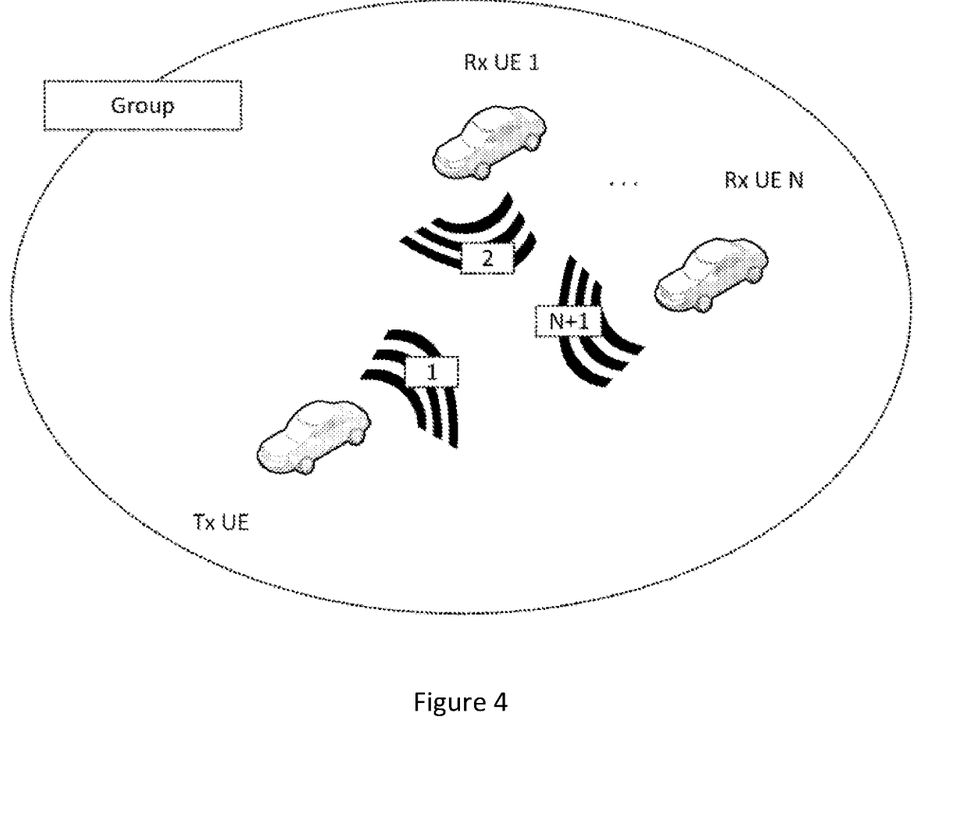

FIG. 4 shows an example in which groupcast transmissions are utilised for the transmission of CSI reports. As set out above a Tx UE may transmit a CSI RS in a groupcast transmission which is received by the Rx I-JES in the group. Each Rx UE calculates CSI for the link from the Tx UE to itself and transmits a CSI report in a groupcast PSSCH. All members of the group thus receive information on the CSI of all links from the Tx UE (assuming all Rx UEs are within range of each other). Such a system is likely to be most interesting in systems operating in Mode 2, but it is also applicable in Mode 1 operation. The use of a groupcast CSI report enables each UE to report to all UEs with one message thus saving N−2 messages. The total number of messages for all UEs in the group to share CSI reports is N.

The process of FIG. 4 can be iterated such that all group members receive information on all links. The group members take it in turns (i.e. each transmits sequentially) to transmit a CSI RS in a groupcast transmission, and all UEs transmit their CSI report in a groupcast transmission. In this process, each transmission can contain both the CSI-RS (to be measured by RX users) as a pilot and the TX UE's CSI report(s) as data. Thus, receiving one PSSCH allows both measuring and reporting. The first UE to transmit CSI-RS may not yet have CSI to transmit. Thus once all UEs have transmitted CSI RS, and all responses have been received, all UEs have CSI on all links (assuming all UEs are within range of each other). A comparable process can also be utilised to share group member locations and distances between UEs. The order in which the UEs transmit CSI RS and report may be preconfigured and implicitly known to each UE (for example based on the user ID of each member), and hence each group member knows when to transmit CSI RS and report. Alternatively, each member may perform resource monitoring and allocation and hence transmit CSI RS and report in the first opportunity it can identify, with each member keeping trying until it has successfully transmitted CSI RS and reported. Such a scheme requires the members to adapt to conditions and may need rapid update of CSI reports prior to their transmission. At each iteration the members may transmit all CSI reports, or only new ones, to reduce the overhead. New reports may be defined as those that are not in the currently reported CSI or reports which are less than a defined time old. Similarly, a CSI report could be transmitted as a differential to the previous report, rather than the full absolute details.

Figure 5:
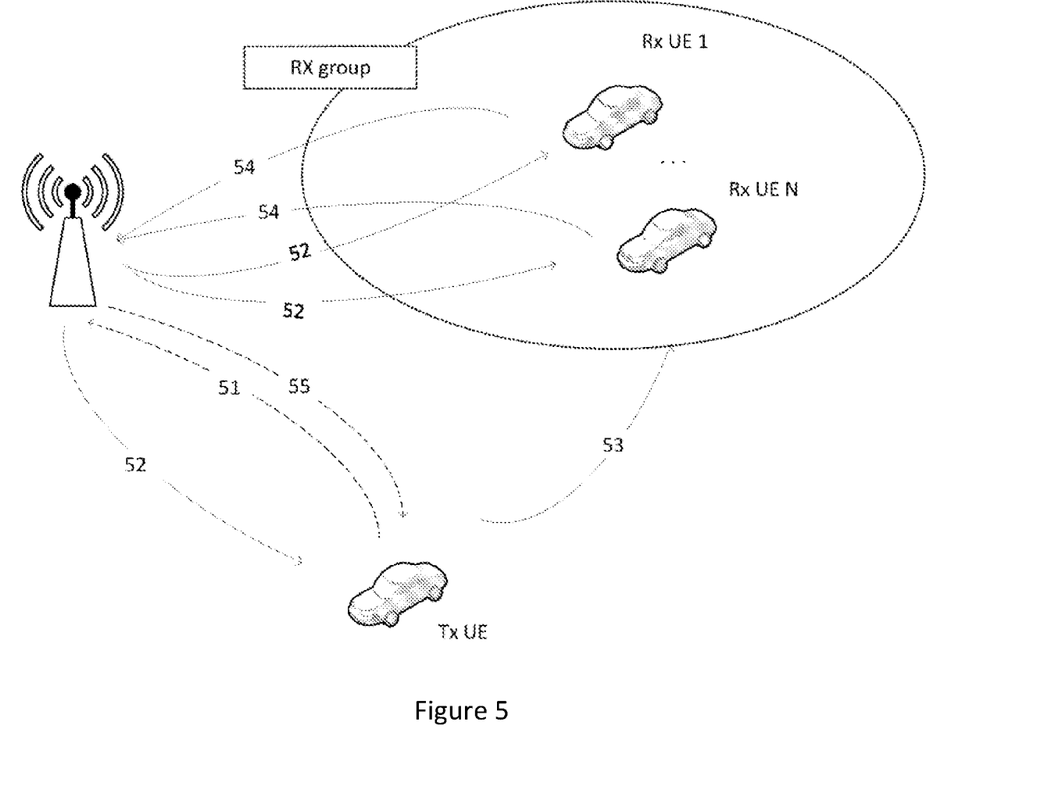

FIG. 5 shows an example in which a base station coordinates CSI reports to be sent directly to the base station over the Uu UL interface. The CSI acquisition process may be started by a message from a member of the group by a message 51 to the base station, or the base station may initiate the process. The base station may schedule each UE directly using a Uu DCI message 52, instructing the UEs to report CSI status for an incoming CSI RS 53 which is transmitted by Tx UE in response to the message 52 from the base station.

Each Rx UE sends a CSI report to the base station via a message over the Uu UL interface, as scheduled by the Uu DCI messages 52. Uu DCI message 52 may an independent message for each UE, or group common Uu DCI message(s) may be used for all or subsets of the group. The Tx UE receives a Uu DCI 52. Uu DCI messages 52 may also be sent. The base station may then transmit the CSI reports to the Tx UE in message 55.

The CSI acquisition process may also be coordinated such that multiple links are calculated and the reports combined into one response from each UE to the base station.

In a variation, each member may receive CSI reports and aggregate them for forwarding on to other members of the group, for example in a groupcast transmission. A member may send on all information, or a processed version to reduce overheads, according to system configuration or as set by a DCI message. In an example in which UEs transmit CSI reports to a Tx UE in a unicast transmission the Tx UE may aggregate the responses and transmit them to the base station. Similarly, where a base station receives the CSI reports it can aggregate them and transmit them to the Tx Ue or any group member. Each group member can aggregate and transmit reports in an iterative process. For example, (not mathematically exact), if in a group, several users are reporting a CSI with a given channel quality, it can be approximated with a single channel with a lower quality. If two users have a channel that would lead to 10% BLER, the group BLER is then $1-(1-0.10)^2=19\%$. Thus, instead of reporting two CSIs that imply a 10% BLER, these can be aggregated into a lower CSI that implies 19% BLER. Any other suitable mechanism may be utilised to convey useful information, for example histograms of feedback data.

As mentioned above, comparable processes can be utilised to share position information which can be useful in groupcast systems. For example, groupcast transmissions may be configured such that only members within a (pre) configured distance are required to send HARQ feedback. Position information can be utilised an any required process.

The techniques and processes described herein may be utilised to perform position acquisition, which can then be distributed in the same manner discussed for CSI information.

As will be understood by the reader, location relates to the absolute position of a UE and can be used by other UEs (or base stations or other nodes) to calculate distance and direction. The word position will be used herein as a collective title for location, distance, and/or position. Location may be the preferred metric as it may convey more information, but distance can be quantised more easily to reduce overhead. For example, 2 bits can be used to indicate four distance ranges of closer, mid-range, far, and out of range. However, distances do not convey direction (albeit direction can also be quantised, for example 2 bits can indicate four segments of 90 degrees each). Also, distance and direction are specific to UE pairs, whereas location is useful to all UEs.

A UE may send its position information in an SCI control message for a groupcast transmission, which then enables all UEs in the group to understand the absolute and relative position of the transmitting UE. Location may be transmitted in a defined coordinate system (e.g. geodesic) or by mapping to a predefined set of locations such as Zone ID in LTE. Location transmission can be performed together with CSI acquisition, or as a separate process using the methods described herein. For example, during a CSI acquisition DCI and/or SCI messages may include an indication whether positions (or distances/directions) should be reported with the CSI report. More granularity could be provided by using two bits to indicate any combination of CSI and/or position acquisition requests. Combining position and CSI transmission may reduce overall overhead since parts of the procedures (e.g. message headers) are reused. It is also likely that CSI and position will change together and so updating both at the same time is sensible.

In the case where CSI reports are sent by unicast transmission the position information (i.e. location, distance, and/or direction) can be reported as a payload in the CSI report. Since the CSI report is expected to be small, it is anticipated there will be adequate space to carry the position information as well. If PSFCH is to be used, data formats may need to be defined to carry the required combinations (feedback, CSI, and/or position). If a UE reports position information to a base station the UE can report all locations or a processed set (e.g. maximum distance, furthest UE, UEs in particular areas). Where groupcast transmission is utilised for CSI reports, position information may be sent in the SCI. Where CSI is sent over I-Ju UL to the base station, UEs can report their position information to the base station with their CSI report. The base station can then transmit the position information, or information derived from it (e.g. maximum distance, furthest UE, UEs in particular areas), to any member of the group.

The foregoing description has been given in the context of sidelink communications in a cellular system, but the principles described herein are also applicable to any group of wireless nodes communicating in a group (for example, mobile devices, IAB nodes, relays, etc).

Although not shown in detail any of the devices or apparatus that form part of the network may include at least a processor, a storage unit and a communications interface, wherein the processor unit, storage unit, and communications interface are configured to perform the method of any aspect of the present invention. Further options and choices are described below.

The signal processing functionality of the embodiments of the invention especially the gNB and the UE may be achieved using computing systems or architectures known to those who are skilled in the relevant art. Computing systems such as, a desktop, laptop or notebook computer, hand-held computing device (PDA, cell phone, palmtop, etc.), mainframe, server, client, or any other type of special or general purpose computing device as may be desirable or appropriate for a given application or environment can be used. The computing system can include one or more processors which can be implemented using a general or special-purpose processing engine such as, for example, a microprocessor, microcontroller or other control module.

The computing system can also include a main memory, such as random access memory (RAM) or other dynamic memory, for storing information and instructions to be executed by a processor. Such a main memory also may be used for storing temporary variables or other intermediate information during execution of instructions to be executed by the processor. The computing system may likewise include a read only memory (ROM) or other static storage device for storing static information and instructions for a processor.

The computing system may also include an information storage system which may include, for example, a media drive and a removable storage interface. The media drive may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media may include, for example, a hard disk, floppy disk, magnetic tape, optical disk, CD or DVD, or other fixed or removable medium that is read by and written to by media drive. The storage media may include a computer-readable storage medium having particular computer software or data stored therein.

In alternative embodiments, an information storage system may include other similar components for allowing computer programs or other instructions or data to be loaded into the computing system. Such components may include, for example, a removable storage unit and an interface, such as a program cartridge and cartridge interface, a removable memory (for example, a flash memory or other removable memory module) and memory slot, and other removable storage units and interfaces that allow software and data to be transferred from the removable storage unit to computing system.

The computing system can also include a communications interface. Such a communications interface can be used to allow software and data to be transferred between a computing system and external devices. Examples of communications interfaces can include a modem, a network interface (such as an Ethernet or other NIC card), a communications port (such as for example, a universal serial bus (USB) port), a PCMCIA slot and card, etc. Software and data transferred via a communications interface are in the form of signals which can be electronic, electromagnetic, and optical or other signals capable of being received by a communications interface medium.

In this document, the terms 'computer program product', 'computer-readable medium' and the like may be used generally to refer to tangible media such as, for example, a memory, storage device, or storage unit. These and other forms of computer-readable media may store one or more instructions for use by the processor comprising the computer system to cause the processor to perform specified operations. Such instructions, generally 45 referred to as 'computer program code' (which may be grouped in the form of computer programs or other groupings), when executed, enable the computing system to perform functions of embodiments of the present invention. Note that the code may directly cause a processor to perform specified operations, be compiled to do so, and/or be combined with other software, hardware, and/or firmware elements (e.g., libraries for performing standard functions) to do so.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory. In an embodiment where the elements are implemented using software, the software may be stored in a computer-readable medium and loaded into computing system using, for example, removable storage drive. A control module (in this example, software instructions or executable computer program code), when executed by the processor in the computer system, causes a processor to perform the functions of the invention as described herein.

Furthermore, the inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other sub-system element.

It will be appreciated that, for clarity purposes, the above description has described embodiments of the invention with reference to a single processing logic. However, the inventive concept may equally be implemented by way of a plurality of different functional units and processors to provide the signal processing functionality. Thus, references to specific functional units are only to be seen as references to suitable means for providing the described functionality, rather than indicative of a strict logical or physical structure or organisation.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices.

Thus, the elements and components of an embodiment of the invention may be physically, functionally and logically implemented in any suitable way. Indeed, the functionality may be implemented in a single unit, in a plurality of units or as part of other functional units. Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term 'comprising' or "including" does not exclude the presence of other elements.

The invention claimed is:

1. A method of determining channel state information in a groupcast system, the method comprising the steps of
    transmitting a signal including a CSI-RS from a first UE which is a member of a group of UEs to all other UEs of the group as a groupcast message; and
    transmitting a signal including channel state information from each UE of the group receiving the CSI-RS to the first UE;
    wherein the CSI-RS is transmitted with a sidelink control information (SCI), and a UE location is conveyed in the SCI;
    wherein the UE location is transmitted using a defined coordinate system or by mapping to a predefined set of locations with Zone IDs;
    in a case where CSI reports are sent by a unicast transmission, the UE location is reported as a payload in the CSI reports;
    wherein each CSI report groupcast transmission is transmitted on a physical sidelink shared channel (PSSCH), and each groupcast transmission enables all UEs to obtain CSI for all links from each transmitting UE to all receiving UEs;
    wherein a groupcast CSI reporting process is iteratively performed by each UE in the group, each UE sequentially transmits a CSI-RS in a groupcast transmission, and all UEs subsequently transmit corresponding CSI reports in groupcast format;
    wherein each transmission comprises both the CSI-RS and previously received CSI reports as data, receiving a groupcast PSSCH transmission allows both CSI measurement and sharing; and
    wherein an order of transmission is preconfigured or determined through resource monitoring, and each CSI report comprises a new or updated CSI data or a differential with respect to a prior CSI report.

2. A method according to claim 1, wherein transmission resources for the CSI-RS and/or channel state information are allocated by a base station.

3. A method according to claim 2, wherein an indication of the allocated resources is transmitted from the base station to the first UE, and the signal including the CSI-RS transmitted by the first UE includes an indication of the allocated resources for transmission of the channel state information.

4. A method according to claim 2, wherein an indication of the allocated resources is transmitted from the base station to each UE of the group.

5. A method according to claim 1, further comprising the step of transmitting the channel state information from the first UE to the base station.

6. A method according to claim 1, wherein the method is initiated by a request from the first UE to the base station.

7. A method according to claim 1, wherein the method is initiated by the base station.

8. A method according to claim 1, wherein the transmission resources for the CSI-RS and/or channel state information are selected by the first UE.

9. A method according to claim 1, wherein the channel state information is transmitted by each UE as a unicast message to the first UE.

10. A method according to claim 1, wherein the channel state information is transmitted by each UE as a groupcast message to all other UEs of the group including the first UE.

11. A method according to claim 10, further comprising
a second UE of the group transmitting a signal including a CSI-RS to all other UEs of the group; and
all UEs of the group other than the second UE transmitting channel state information in a groupcast message to all other UEs of the group.

12. A method according to claim 1, wherein the signal including channel state information also includes an indication of a location of the UE transmitting the signal including channel state information.

13. A method according to claim 12, wherein UEs receiving the location information utilise that information for directional transmissions to the relevant UE.

14. A method according to claim 12, wherein the first UE transmits the location information to the base station.

15. A method of determining channel state information in a groupcast system, the method comprising the steps of
transmitting a message to each UE of a group instructing each UE to report channel state information to the base station in response to a CSI-RS to be received from a first UE of the group;
in response to the message the first UE transmitting a CSI-RS to the other UEs of the group; and
each UE receiving the CSI-RS and transmitting channel state information to the base station;
wherein the CSI-RS is transmitted with a sidelink control information (SCI), and a UE location is conveyed in the SCI;
wherein the UE location is transmitted using a defined coordinate system or by mapping to a predefined set of locations with Zone IDs;
in a case where CSI reports are sent by a unicast transmission, the UE location is reported as a payload in the CSI reports;
wherein each CSI report groupcast transmission is transmitted on a physical sidelink shared channel (PSSCH), and each groupcast transmission enables all UEs to obtain CSI for all links from each transmitting UE to all receiving UEs;
wherein a groupcast CSI reporting process is iteratively performed by each UE in the group, each UE sequentially transmits a CSI-RS in a groupcast transmission, and all UEs subsequently transmit corresponding CSI reports in groupcast format;
wherein each transmission comprises both the CSI-RS and previously received CSI reports as data, receiving a groupcast PSSCH transmission allows both CSI measurement and sharing; and
wherein an order of transmission is preconfigured or determined through resource monitoring, and each CSI report comprises a new or updated CSI data or a differential with respect to a prior CSI report.

16. A method of sharing location information between UEs, the method comprising
transmitting a sidelink control information (SCI) message from a first UE of a group of UEs to at least one other UE of the group, wherein the SCI includes the first UE's location, and
utilising the location for user grouping, relaying/cooperation management, group leader selection, and/or power control; wherein the first UE's location is transmitted using a defined coordinate system or by mapping to a predefined set of locations with Zone IDs;
in a case where CSI reports are sent by a unicast transmission, the UE location is reported as a payload in the CSI reports;
wherein each CSI report groupcast transmission is transmitted on a physical sidelink shared channel (PSSCH), and each groupcast transmission enables all UEs to obtain CSI for all links from each transmitting UE to all receiving UEs;
wherein a groupcast CSI reporting process is iteratively performed by each UE in the group, each UE sequentially transmits a CSI-RS in a groupcast transmission, and all UEs subsequently transmit corresponding CSI reports in groupcast format;
wherein each transmission comprises both the CSI-RS and previously received CSI reports as data, receiving a groupcast PSSCH transmission allows both CSI measurement and sharing; and
wherein an order of transmission is preconfigured or determined through resource monitoring, and each CSI report comprises a new or updated CSI data or a differential with respect to a prior CSI report.

* * * * *